COMBINATION RADIO AND TELEVISION CHASSIS

Filed April 21, 1949 3 Sheets-Sheet 1

FIG. I

INVENTOR.
Samuel M. Goldfus
BY
Foorman L. Mueller
Atty.

Nov. 11, 1952 S. M. GOLDFUS 2,617,878

COMBINATION RADIO AND TELEVISION CHASSIS

Filed April 21, 1949 3 Sheets-Sheet 2

*INVENTOR.*
Samuel M. Goldfus

*BY* Foorman L. Mueller

Attys.

Nov. 11, 1952 S. M. GOLDFUS 2,617,878

COMBINATION RADIO AND TELEVISION CHASSIS

Filed April 21, 1949 3 Sheets-Sheet 3

INVENTOR.
Samuel M. Goldfus

BY Foorman L. Mueller

Attys.

Patented Nov. 11, 1952 2,617,878

UNITED STATES PATENT OFFICE 2,617,878

COMBINATION RADIO AND TELEVISION CHASSIS

Samuel M. Goldfus, Chicago, Ill., assignor to Motorola, Inc., Chicago, Ill., a corporation of Illinois Application April 21, 1949, Serial No. 88,760

4 Claims. (Cl. 178—5.8)

This invention relates generally to electronic wave receivers and more particularly to a combined television receiver and amplitude and frequency modulation radio receiver.

In the prior art television and radio reception has been combined in a single cabinet but in such units it has been common practice to provide separate chassis for the television receiver and for the radio receiver. In other words, only the loudspeaker, and in some instances the audio amplifier, are used for both television and radio reception. This results in a considerable duplication of elements as separate amplifying and detecting stages are provided in the radio and television receivers. For this reason, the combined units are undesirably large and very expansive.

Although combined television and radio circuits have been built up, these circuits have been relatively complicated and not entirely satisfactory as the techniques required for reception of television and broadcast radio are quite different due to the different frequencies involved and the different characteristics of the signals received. A further reason for providing separate chassis for television and radio receivers which are combined in the same cabinet is that each of the individual chassis may be a standard item manufactured in large production and the two chassis can be provided separately at less expense than a combined chassis which would find only limited requirements.

It is, therefore, an object of the present invention to provide a television set which can be used as a separate unit and to which auxiliary components may be added to provide amplitude modulation or frequency modulation radio reception.

A further object of this invention is to provide a television receiver circuit arranged so that it may be converted for use as an amplitude modulation receiver or a frequency modulation rereiver merely by the addition of tuners for operation in the frequency ranges to be received.

Another object of this invention is to provide a television receiver including a chassis on which a complete television receiver circuit is mounted and having provisions therewith for mounting a sub-chassis thereon including tuners adapted to operate in the frequency ranges used for amplitude modulation and frequency modulation sound transmissions.

A feature of this invention is the provision of a television receiver including components mounted on a main chassis, and tuners for receiving amplitude modulation and frequency modulation sound signals mounted on a sub-chassis adapted to be supported on the main chassis.

A further feature of this invention is the provision of a combined television and radio receiver in which the intermediate frequency amplifier of the television receiver is adapted to amplify the television video and sound signals, or amplitude modulation or frequency modulation sound signals transmitted alone, with one stage of the intermediate frequency amplifier being adapted to function as a detector for amplitude modulation sound reception.

Another feature of this invention is the provision of a combined television and frequency modulation radio receiver in which the television and radio sound signals are reduced to the same intermediate frequency and are amplified and detected by the same circuits.

A still further feature of this invention is the provision of a combined television and radio receiver including switching means for conditioning the components thereof for various desired modes of operation and for applying operating potential to the components used in each operation.

Further objects, features and advantages will be apparent from a consideration of the following description when taken in connection with the accompanying drawings in which.

In practicing the invention there is provided a television receiver having a radio frequency portion, an intermediate frequency amplifier for sound and video signals, means for detecting and reproducing the video signal, a sound intermediate frequency amplifier coupled to the first intermediate frequency amplifier for further amplifying the sound signals, and sound detecting, amplifying and reproducing means. For converting the receiver for amplitude modulation sound reception in the broadcast frequency range and for frequency modulation reception, a subchassis is provided including tuners for receiving signals of the desired frequencies. The output of the tuners is applied to the first intermediate frequency amplifier and amplified thereby. For frequency modulation reception the signal is reduced to the same intermediate frequency as the television sound signal and is amplified and detected by the same circuits. For amplitude modulation reception, one stage of the first intermediate frequency is modified to function as a detector with the detected signals being applied therefrom to the audio amplifying and reproducing components of the television receiver.

Figure 1:
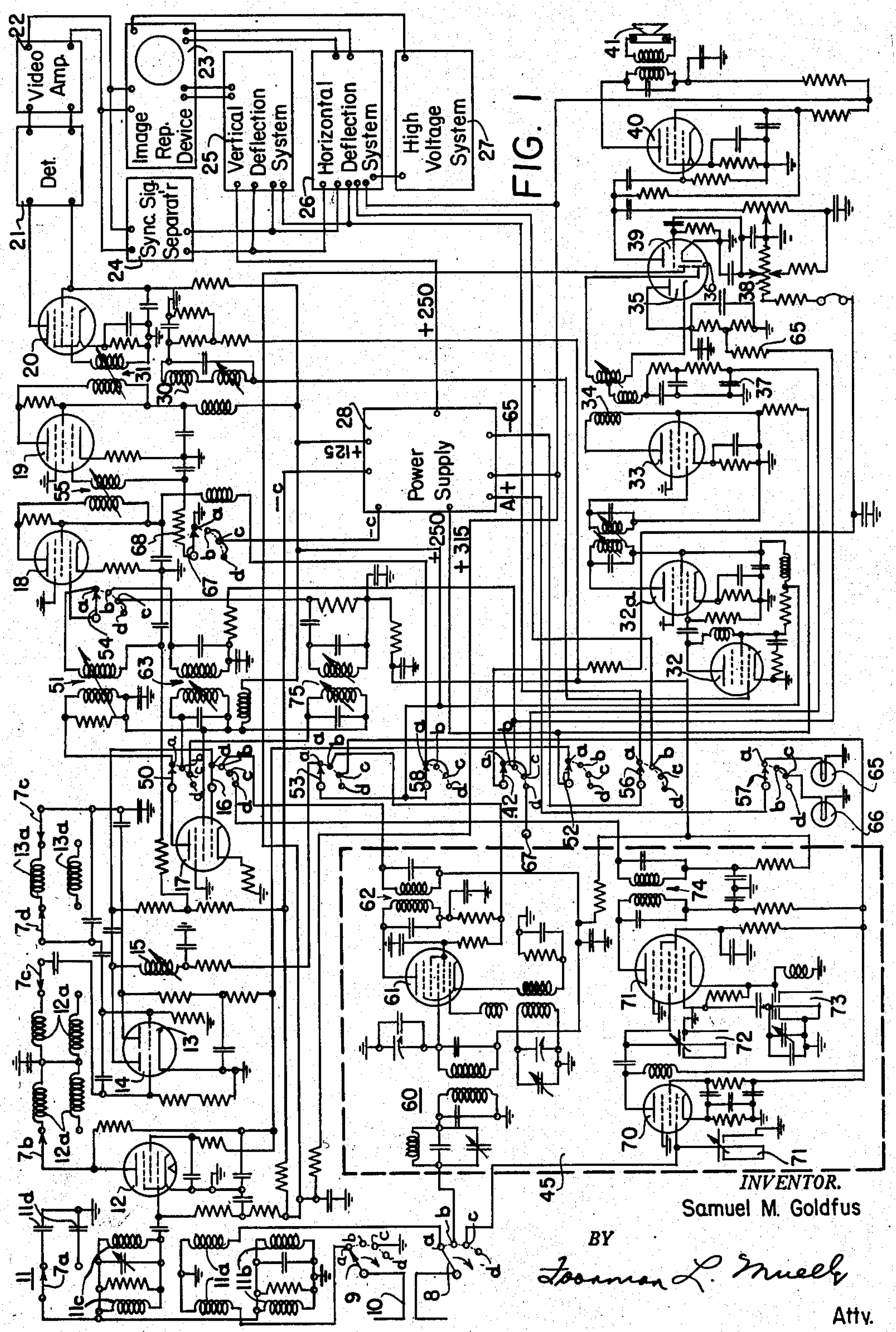
Fig. 1 is a schematic diagram of the circuit of the combined television and radio receiver.

In Fig. 1 there is illustrated a television receiver including an antenna 10, which is illustrated as a dipole, coupled through antenna input circuit 11 to radio frequency amplifier 12. An oscillator section 13 and a modulator section 14 are provided in a single envelope and function to reduce the incoming signal to intermediate frequency. Inductor 15 is tuned to select the desired intermediate frequency. The intermediate frequency signals are applied through the contact *a* of switch 16 to the video intermediate frequency amplifier which includes the tubes 17, 18, 19 and 20. The intermediate frequency stages are stagger tuned so that the band of signals transmitted thereby is wide to provide good picture detail. The amplified intermediate frequency signal is applied from the tube 20 to detector 21 wherein the video signal is derived from its associated carrier. The composite video signal is amplified by video amplifier 22 and applied to image reproducing device 23 for controlling the intensity of the cathode ray beam thereof. Synchronizing signals which form a part of the composite video signals are obtained from synchronization signal separator 24 and are used to synchronize the vertical and horizontal deflection systems 25 and 26. The deflection systems cause the beam to scan a screen so that the transmitted image is formed thereon. A high voltage system 27 is provided for providing the second anode voltage for the cathode ray tube.

The sound signal is derived from the intermediate frequency amplifier by coil 30 coupled to the coupling coils 31 connecting the output of tube 19 to the input circuit of tube 20. The signal is applied to a sound intermediate frequency amplifier including tubes 32, 32*a* and 33 which select and further amplify the same. From the tube 33, the intermediate frequency signal is applied to coil 34 of a ratio detector including the diode sections 35 and 36. The audio signal is developed across capacitor 37 and applied to volume control resistor 38 through contact *a* of switch 42. This signal is then amplified by the triode section 39, which forms the first audio amplifier stage, and applied to the output amplifier or beam power tube 40. The amplified audio output is then reproduced in loudspeaker 41.

The operation of the receiver for television reception will be apparent to those skilled in the art. The video and audio carrier waves are picked up by antenna 10 and applied through contacts *a* of switches 8 and 9 to the primary coils 11*a* of the antenna circuit 11. The signals are picked up by the secondary coils 11*b* and 11*c* which are tuned to the low and high frequency television bands respectively. Condensers 11*d* may be selectively connected to the antenna circuit by contact 7*a* of a station selector switch 7 for adjusting the same for operation on any desired television channel. Although only two condensers 11*d* are shown, any desired number may be provided. The signals are amplified in the amplifier 12 which includes a plurality of double tuned circuits 12*a*, tuned to the frequencies of the various television channels. These circuits are connected to the amplifier 12 by contacts 7*b* and 7*c* of the station selector switch 7. The received signals are reduced in frequency in the modulator 14 to which demodulating signals are provided by the oscillator 13. The oscillator includes a plurality of coils 13*a* for tuning the same to the frequencies required for the various television channels and are connected in the circuit by contacts 7*d* and 7*e* of the station selector switch 7. Operating potential is applied to the radio frequency amplifier 12 and oscillator 13 by contact *a* of switch 52 and to the modulator 14 by contact *a* of switch 53.

The intermediate frequency is selected by the tuned circuit including the inductor 15 and then amplified in tube 17 and applied through contact *a* of switch 50 to tuned circuit 51. The signal is then applied through contact *a* of switch 54 to the second intermediate amplifier tube 18 which is tuned by tuned circuits 55. It is noted that during television operation, potential is applied to the plate and screen grid of the tube 18 through contact *a* of switch 58. The intermediate frequency video signals are then amplified in tubes 19 and 20 and applied to detector 21. A switching arrangement is provided for applying the proper contrast bias to the grid of the third video intermediate frequency amplifier 19 by switch 67. This switch, when in position *a*, connects the grid of tube 19 to ground through resistor 68.

As previously stated, the sound signals are picked up by the coil 30 and applied to the sound intermediate frequency amplifier including the tubes 32, 32*a*, and 33. The frequency modulated sound is then derived from the intermediate frequency wave by the ratio detector (35, 36) and applied to the audio amplifier (39, 40) and sound reproducing means 41.

For converting the television receiver for operation to receive amplitude modulation sound signals and frequency modulation sound signals when transmitted alone, components are provided which are mounted on a separate subchassis. These components are included in the dotted rectangle indicated as 45 in Fig. 1. The components required include tuners for the frequencies involved and the required frequency converting circuits. For amplitude modulation reception a single tube is required which operates as a converter. For frequency modulation reception two stages are required, one being a radio frequency amplifier and the second a converter.

For operation as a broadcast receiver the various switches illustrated in Fig. 1 are all moved so that the terminals marked *b* are connected. It is noted that the switches 8 and 9 are so arranged that one portion of the dipole antenna 10 is connected through contact *b* of switch 8 to the antenna input circuit 60 of the broadcast band tuner. A converter 61 is provided for reducing the incoming signals to signals of intermediate frequency. Signals of the desired frequency are selected by the tuned circuit 62 and applied through contact *b* of switch 16 to the intermediate frequency amplifier tube 17. For broadcast reception the output circuit of tube 17 is connected through contact *b* of switch 50 to the tuned circuit 63 which further selects the intermediate frequency. This circuit is coupled through contact *b* of switch 54 to the grid of the tube 18. It will be noted that when the switch 58 is in the broadcast position the plate circuit of the tube 18 is open. That is, there is no connection to contact *b* of switch 58. Therefore, the grid and cathode of the tube 18 function as a diode detector for deriving the sound signals from the intermediate frequency carrier wave. The use of the second intermediate frequency amplifier tube 18 as the sound detector provides the advantage that a short lead may be used to connect the intermediate frequency amplifier tube 17 and the detector. This eliminates the need for careful shielding which would be required if a long lead was required. The audio signal is built up across resistor 65 and applied to the volume control 38 through the contact *b* of switch 42. The audio signal is then amplified by the tubes 39 and 40 and reproduced in loudspeaker 41.

For operation as a frequency modulation receiver, the various switches are moved to the position so that contacts $c$ are engaged. The contacts $c$ of switches 8 and 9 connect the dipole antenna 10 between ground and the grid of radio frequency amplifier tube 70. The antenna circuit is tuned by a capacitor-inductor unit indicated 71. Although any suitable tuning system may be used, a transmission line tuner as disclosed in the application of Gus W. Wallin, Serial No. 625,145, filed October 29, 1945, subject: Tunable Resonant System, has been found to be highly satisfactory. The amplified radio frequency signals are applied to converter 71, after being selected by the tuned circuit 72. The oscillator section of the converter is tuned by a similar tuned circuit 73. Each of these units may be in accordance with the disclosure of application referred to above. The output of the converter is selected by the intermediate frequency transformer 74 and applied to the terminal $c$ of switch 16. The frequency modulation signal is amplified in the tube 17 and applied through contact $c$ of switch 50 to the tuned circuit 75. The selected signal is then applied through terminal $c$ of switch 54 to the second intermediate frequency amplifier stage 18. Operating potential is applied to this tube for frequency modulation operation through the contact $c$ of switch 58. The intermediate frequency signal is then further amplified in amplifier tube 19. As previously stated, the audio signal is derived from the video intermediate frequency amplifier by the coil 30 and is then applied to the sound intermediate frequency amplifier including stages 32 and 33. This sound signal is generally similar to the sound signal received during television reception and is amplified, detected and reproduced in the manner previously described.

Operating potentials are provided for the various components of the circuit from the power supply 28 through switch contacts. The power supply provides 315, 250 and 125 volts B+ sources, and A+ source and C− sources for bias purposes. For television operation, the 315 volt potential is applied to the audio amplifiers 39 and 40 and to the horizontal deflection system 26. The 250 volt supply is applied to the radio frequency amplifier 12 and oscillator 13 through contact $a$ of switch 52, and also to the sound intermediate frequency amplifier tube 33 and the vertical deflection system 25. Plate potential of 125 volts is applied to the television mixer 14 from contact $a$ of switch 53. As previously stated, operating potential is selectively applied to the plate of the second video intermediate amplifier tube 18 through the contacts of switch 58. Potential of 125 volts is applied to tube 18 as well as to the video intermediate frequency amplifier tubes 17, 19 and 20 and sound intermediate frequency amplifier tubes 32 and 32$a$. Switch 56 is provided for completing the connection of the horizontal and vertical deflection generators to the negative side of the power supply for television operation.

For operation on the amplitude modulation broadcast band, the switches are all in position to engage contacts $b$ and in this position the switch 53 applies plate potential to the tube 61. For FM operation potential is applied to the tubes 70 and 71 through contact $c$ of switch 53. An additional switch level 57 is provided for connecting pilot lights 65 and 66 which are provided for television and AM and FM use. When the switches are in the $a$ position, the light 65 will be connected to A+ supply and when the switches are in the $b$ and $c$ positions, the light 66 will be connected.

The switches include a fourth position $d$ so that the system can be used as an amplifier of a phonograph reproducer if desired. In this position, power is applied only to the sound portion of the receiver and the phonograph pickup may be connected to terminal 67 connected to contact $d$ of switch 42.

Figure 2:
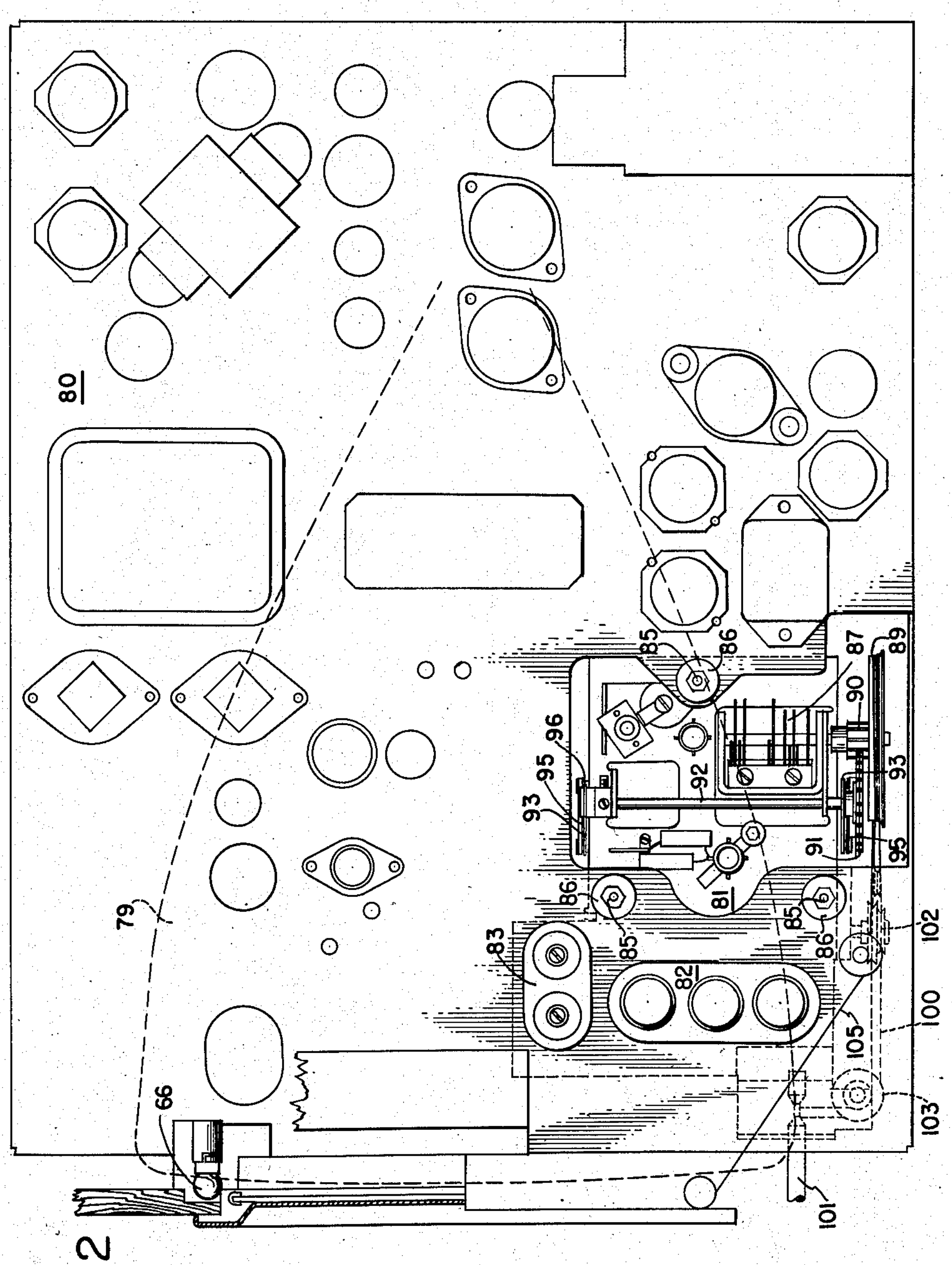
Fig. 2 illustrates the chassis of the receiver.
Figure 4:
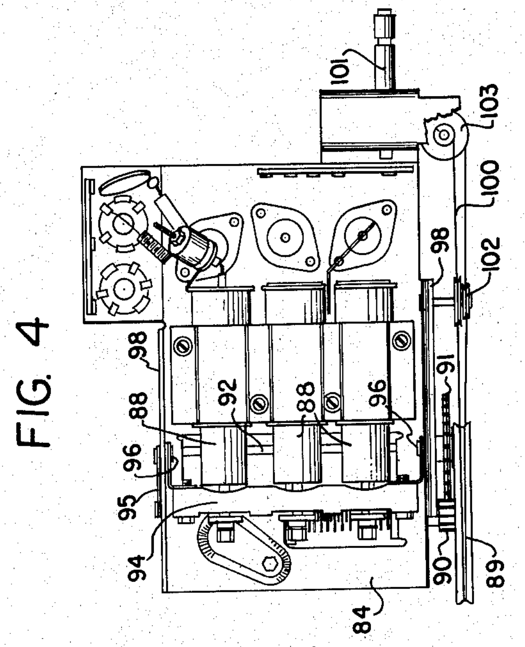
Fig. 4 is a top view of the tuner sub-assembly.
Figure 3:
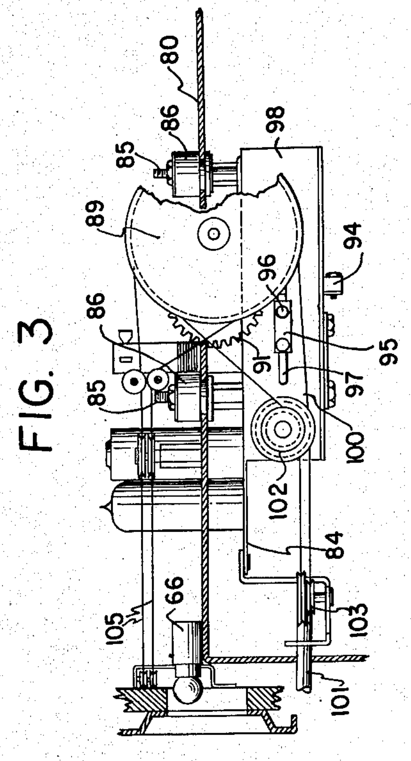
Fig. 3 is a side view of the amplitude and frequency modulation tuner sub-assembly.

Referring now to Fig. 2, there is illustrated a chassis 80 for the television receiver on which the various components are mounted. A cathode ray tube 79 may be mounted above the chassis as indicated by the dotted lines. Openings 81, 82 and 83 are provided in the chassis for receiving a sub-chassis 84 which includes the tuners for broadcast and frequency modulation reception. The components of this tuner are the components included in the space defined by the broken line in Fig. 1 and indicated as 45. Figs. 2, 3 and 4 illustrate more in detail the structure of the tuner. It is apparent from Fig. 3 that the sub-chassis 84 of the tuner is mounted below the main chassis 80 of the receiver and is supported therefrom by bolts 85 cooperating with shock mounts 86. The tuner 45 includes a condenser tuning assembly 87 as shown in Fig. 2 and a movable core structure 88 best shown in Fig. 4. Both the condenser assembly and the cores are movable in response to movement of the wheel 89 to vary the tuning of the respective circuits.

It is apparent from Figs. 2 and 3 that movement of the wheel 89 is directly transmitted to the shaft of the condenser assembly 87 for broadcast tuning. For tuning in the frequency modulation band, the movement of the wheel 89 is transmitted through gears 90 and 91 to the shaft 92. Arms 93 are secured to the shaft 92 and are connected to the carriage 94 supporting the cores 88 by arms 95. Connection is made between the arms 95 and the carriage by pins 96 which move in slots 97 in the sides 98 of the chassis 84. Therefore, the receiver is tuned by the same control for broadcast amplitude modulation and frequency modulation reception. Movement of the wheel 89 is provided through the string drive 100 operated by spindle 101 to which a control knob may be applied. The pulleys 102 and 103 keep the string straight and tight. A second string drive 105 may be connected to the same wheel 89 for moving an indicator to indicate the tuning during broadcast and frequency modulation reception. The dial light 66 illuminates the indicator when the receiver is switched for broadcast and frequency modulation reception.

It is seen from the above that there is provided a television receiver which is complete in itself and which includes provisions for adding a sub-chassis including tuners for reception of amplitude modulation sound signals and frequency modulation sound signals. The television receiver can thereby be converted by the addition of the sub-chassis for three-way operation. Except for the tuners no other components are necessary for operation either as an amplitude modulation broadcast receiver or as a frequency modulation receiver, but various components of the television receiver are switched for operation in a different manner in the various modes of operation. Such a construction obviously facilitates large scale production of receivers, as a single chassis provides a television receiver and also the basic components for a three-way receiver.

Television receivers are being constructed in accordance with the invention and have provided highly satisfactory operation. This construction permits a smaller combination three-way receiver than formerly available and also makes possible small radio-television combinations including record players. As previously stated a fourth switching position is provided for operation of the audio system as a record player.

While one embodiment of the invention has been described, it is obvious that various changes and modifications can be made therein within the intended scope of the invention as defined in the appended claims.

I claim:

1. In an electronic wave receiver of the superheterodyne type adapted to be selectively used to receive amplitude modulation sound signals, frequency modulation sound signals, and television signals including frequency modulation sound signals and video signals, the combination including, individual tuners for amplitude modulation sound signals, frequency modulation sound signals, and television signals, an intermediate frequency amplifier including a first stage for amplifying frequency modulation sound signals, amplitude modulation sound signals and video signals, and a second stage for amplifying frequency modulation sound signals and video signals and for detecting amplitude modulation sound signals, and switching means for selectively coupling said tuners to said intermediate frequency amplifier and for conditioning said second stage for operation as an amplifier or as a detector.

2. An electronic wave receiver including in combination, a main chassis having components thereon forming a complete television receiver circuit, said components including a tuner for selecting and converting television signals, and an intermediate frequency amplifier having first and second stages positioned to be interconnected by a relatively short lead, a sub-chassis having tuners thereon for selecting and converting amplitude modulation sound signals and frequency modulation sound signals, said main chassis having provisions thereon for receiving said sub-chassis therewith, and means for interconnecting said components on said main chassis and said sub-chassis so that complete receiver circuits are provided for receiving and reproducing amplitude modulation sound signals and frequency modulation sound signals, said interconnecting means including switching means on said main chassis for selectively coupling said tuners to said intermediate frequency amplifier, said switching means connecting said second stage of said intermediate frequency amplifier for operation as an amplitude modulation detector when said amplitude modulation tuner is connected to said intermediate frequency amplifier, whereby said first stage of said intermediate frequency amplifier is operative to amplify television signals, amplitude modulation signals and frequency modulation signals, and said second stage amplifies television signals and frequency modulation signals and detects amplitude modulation signals.

3. An electronic wave receiver including in combination, a main chassis having components thereon forming a complete television receiver circuit, said components including a tuner for selecting and converting television signals, and an intermediate frequency amplifier having first and second stages positioned to be interconnected by a relatively short lead, a sub-chassis having a tuner thereon for selecting and converting amplitude modulation signals, said main chassis having provisions thereon for receiving said sub-chassis therewith, and means interconnecting said components on said main chassis and said sub-chassis so that a complete amplitude modulation receiver circuit is provided, said interconnecting means including switching means on said main chassis for selectively coupling said tuners to said intermediate frequency amplifier, said switching means connecting said second stage of said intermediate frequency amplifier for operation as an amplitude modulation detector when said amplitude modulation tuner is connected to said intermediate frequency amplifier, whereby said first stage of said intermediate frequency amplifier is operative to amplify television signals and amplitude modulation signals and said second stage amplifies television signals and detects amplitude modulation signals.

4. An electronic wave receiver including in combination, a main chassis having components thereon forming a complete television receiver circuit for receiving and reproducing waves within a first frequency range modulated by video signals and sound signals including, an antenna circuit, a tuner, amplifying means, detecting means, and image and sound reproducing means, a sub-chassis including a tuner for receiving sound modulated waves within a second frequency range, said main chassis including provisions for receiving said sub-chassis thereon, and conductor means for interconnecting said components on said main chassis and said tuner on said sub-chassis so that a complete receiver is provided for receiving and reproducing sound modulated waves within said second frequency range, said conductor means including switch means for selectively connecting said tuner on said sub-chassis to said antenna circuit and to said amplifying means to provide a receiver for receiving and reproducing sound modulated waves within said second frequency range.

SAMUEL M. GOLDFUS.

REFERENCES CITED

The following references are of record in the file of this patent:

UNITED STATES PATENTS

| Number | Name | Date |
|---|---|---|
| 2,068,002 | Batchelor | Jan. 19, 1937 |
| 2,155,126 | Goldmark | Apr. 18, 1939 |
| 2,165,794 | Holmes | July 11, 1939 |
| 2,183,741 | Grundmann | Dec. 19, 1939 |
| 2,205,461 | Batchelor | June 25, 1940 |
| 2,270,652 | Espley | Jan. 20, 1942 |
| 2,408,644 | Huff | Oct. 1, 1946 |
| 2,439,412 | Mitchell | Apr. 13, 1948 |
| 2,519,415 | Thomas | Aug. 22, 1950 |

FOREIGN PATENTS

| Number | Country | Date |
|---|---|---|
| 568,747 | Great Britain | Apr. 18, 1945 |

OTHER REFERENCES

Riders Television Manual, vol. 1, 1948, pages GE-TV-1-57, 1-58.